(12) United States Patent
Krishnamachari (10) Patent No.: US 6,760,129 B1
(45) Date of Patent: Jul. 6, 2004

(54) ARITHMETIC CODING-BASED FACSIMILE COMPRESSION WITH ERROR DETECTION

(75) Inventor: Santhana Krishnamachari, Ossining, NY (US)

(73) Assignee: Telenor Satellite Services Holdings, Inc., Rockville, MD (US)

( * ) Notice: Subject to any disclaimer, the term of this patent is extended or adjusted under 35 U.S.C. 154(b) by 0 days.

(21) Appl. No.: 09/600,291

(22) PCT Filed: Jan. 15, 1999

(86) PCT No.: PCT/US99/00865

§ 371 (c)(1), (2), (4) Date: Oct. 17, 2000

(87) PCT Pub. No.: WO99/37085

PCT Pub. Date: Jul. 22, 1999

Related U.S. Application Data (60) Provisional application No. 60/071,680, filed on Jan. 16, 1998.

(51) Int. Cl.[7] .................................................. H04N 1/04

(52) U.S. Cl. ........................................ 358/474; 382/247

(58) Field of Search ................................. 358/474, 505, 358/513, 516, 529, 539, 261.1, 267.2; 382/247

(56) References Cited

U.S. PATENT DOCUMENTS 4,673,987 A * 6/1987 Toyokawa ................... 358/260
4,905,297 A * 2/1990 Langdon, Jr. ................ 382/56

* cited by examiner

*Primary Examiner*—Kimberly Williams
*Assistant Examiner*—Negussie Worku
(74) *Attorney, Agent, or Firm*—Bell, Boyd & Lloyd LLC (57) ABSTRACT

A method and apparatus for compressing facsimile documents based on arithmetic coding. A combination of one-dimensional and two-dimensional arithmetic coding is employed to ensure that the effect of a transmission error is not propagated to the whole document. Appropriate contexts for the probabilistic models associated with arithmetic coding for one and two dimensional cases are presented. An error detection scheme to identify the presence of transmission errors is also presented.

17 Claims, 4 Drawing Sheets

CONTEXT FOR 2-D

CONTEXT FOR 1-D

ARITHMETIC CODING-BASED FACSIMILE COMPRESSION WITH ERROR DETECTION

This application claims the benefit of provisional application ser. No. 60/071,680 filed Jan. 16, 1998.

FIELD OF THE INVENTION

The present invention generally concerns the field of facsimile transmission of documents, and more particularly concerns an algorithm for compressing facsimile documents based on arithmetic coding.

BACKGROUND OF THE INVENTION

Arithmetic coding is a well known concept that has been applied in a number of information transmission environments, including facsimile. The basic idea behind arithmetic coding is the mapping of a sequence of symbols to be encoded to a real number in the interval [0.0,1.0), where a square bracket "[" indicates that equality is allowed and a curved bracket ")" indicates otherwise. The binary expansion of this real number is then transmitted to the arithmetic decoder, where the inverse mapping is performed to retrieve the encoded symbols.

Conventional coding techniques, including Huffman coding, assign distinct code words to different input symbols and achieve data compression by assigning shorter code words to more probable symbols. In arithmetic coding, on the contrary, there is no assignment of specific code words to different input symbols. Instead, the interval [0.0,1.0) is divided into many sub-intervals, each of which is assigned to different input symbols. Less probable symbols get short intervals, and compression is achieved by assigning longer intervals to more probable symbols.

Figure 1:
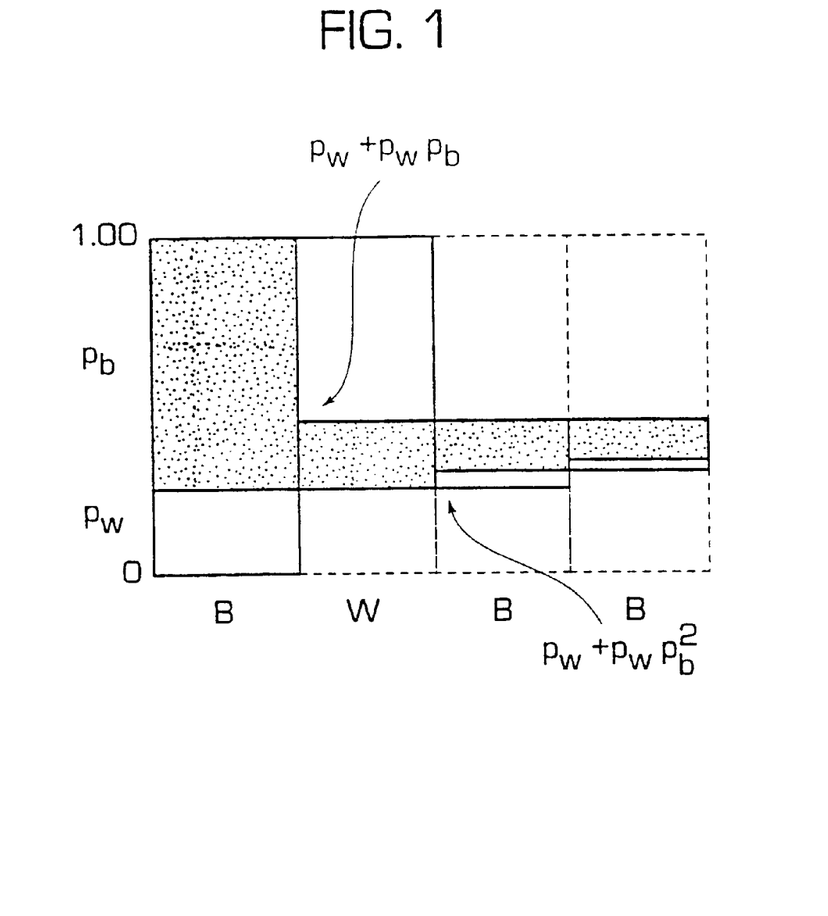
FIG. 1 is a basic illustration of arithmetic coding as applied to the transmission of black and white symbols.

An illustration of this principle is in FIG. 1, which can form the basis of an example of arithmetic coding. The illustration shows that the input symbol takes two possible values, B and W. In a facsimile document, B and W correspond to black and white picture elements (pel) respectively. Let $P_b$ and $P_w$ be the probabilities of occurrences of B and W respectively. To begin with, the coding interval is [0.0,1.0) with the lower bound $L_0$ 0.0 and the upper bound $U_0=1.0$ and the range (which is the difference between the upper and lower bound) $R_0=1.0$. This coding interval is divided into two sub-intervals: [0.0, $P_w$) corresponding to W, and [$P_w$, 1.0) corresponding to B. The lengths of the sub-intervals are proportional to the probabilities of B and W. If $P_b=0.75$ and $P_w=0.25$, then the interval corresponding to B is three times longer than the interval corresponding to W.

When each symbol in the input sequence is coded, the lower bound, the upper bound and the range will experience a change. If the first symbol in the sequence to be encoded is B, the new coding interval is [$P_w$, 1.0). The upper bound remains the same. The new lower bound is $L_1=P_w$, and the new range is $R_1=R_0 P_b=P_b$. The shaded portion in FIG. 1 represents the coding interval.

This coding interval is further sub-divided into two sub-intervals: [$P_w$, $P_w+P_bP_w$) corresponding to W, and [$P_w+P_bP_w$, 1.0) corresponding to B. If the next symbol is a W, the new coding interval is [$P_w$, $P_w+P_bP_w$). The lower bound remains uncharged at $P_w$ and the new range is $R_2=R_1P_w=P_bP_w$. FIG. 1 shows the changes in the lower bound, the upper bound and the range for the first four symbols, the third and fourth symbols both being B. The lower bound after the third symbol is $P_w+P_wP_b^2$ and the coding interval [$P_w+P_wP_b^2$, $P_w+P_wP_b$).

In general, if $L_{(n-1)}, R_{(n-1)}$ are the values of the lower bound and the range before the $n^{th}$ symbol is encoded, the following rule is used to change these values:

If the $n^{th}$ symbol is B:

$$L_n = L_{(n-1)} + R_{(n-1)}P_w$$

$$R_n = R_{(n-1)}P_b$$

If the $n^{th}$ symbol is W:

$$L_n = L_{(n-1)}$$

$$R_n = R_{(n-1)}P_w$$

The corresponding upper bound $U_n$ can be obtained by adding $L_n$ and $R_n$. Finally, when all the symbols in the input are encoded, the binary expansion corresponding to any real number in the current coding interval is transmitted to the arithmetic decoder. With the knowledge of the probabilities $P_b$ and $P_w$, the arithmetic decoder follows the same sequence of dividing the intervals to retrieve the coded input.

For example, let the encoder encode only three input symbols and transmit a real number that lies in the coding interval after encoding the first three symbols. The decoder receives this number and lets it be a value, which lies in the interval [$P_w+P_wP_b^2$, $P_w+P_wP_b$). To begin decoding, the decoder divides the coding interval [0.0, 1.0) into two intervals: [0.0,$P_w$) corresponding to W and [$P_w$,1.0) corresponding to B. Since, value lies in the interval corresponding to B, the decoder decodes the first symbol to be B. Now the new coding interval is [$P_w$,1.0), which in turn is sub-divided into two intervals, [$P_w$, $P_w+P_bP_w$) corresponding to W and [$P_w+P_bP_w$ 1.0) corresponding to B. Since value lies in the interval corresponding to W, the decoder decodes the second symbol to be W and proceeds so on.

An important task in arithmetic coding is the proper estimation of the probabilities $P_b$ and $P_w$. The compression efficiency that can be achieved depends on the accuracy of these probability estimates. In the discussion presented above, it was implicitly assumed that the values of $P_b$ and $P_w$, are known and remain the same during the encoding process. In practice, there does not exist a single set of probability values that can efficiently model different facsimile documents. Even within a single document, there is so much variation (for example the borders predominantly contain white pels, whereas the text in the document contains more black pels), it is not conceivable to use a single set of probability values.

A more efficient scheme is to initialize the probabilities to a suitable value at the start of encoding and adapt the values as the encoding proceeds. In the definition of arithmetic coding, there is no restriction that the probabilities remain unchanged during encoding, as long as the decoder can exactly mimic the changes in the probability values. One way of adapting the probabilities is to initialize counts $N_b$ and $N_w$ to 1 and after encoding each input symbol that is either a B or W, the corresponding count is incremented by one. The probabilities of W and B can be obtained from the counts, using, $$P_w = \frac{N_w}{N_w + N_b}$$

and $$P_w = \frac{N_b}{N_w + N_b}.$$

This initialization is an unbiased initialization, since the initial values for $N_b$ and $N_w$ are equal. It is also possible to use a biased initialization.

Figure 2:
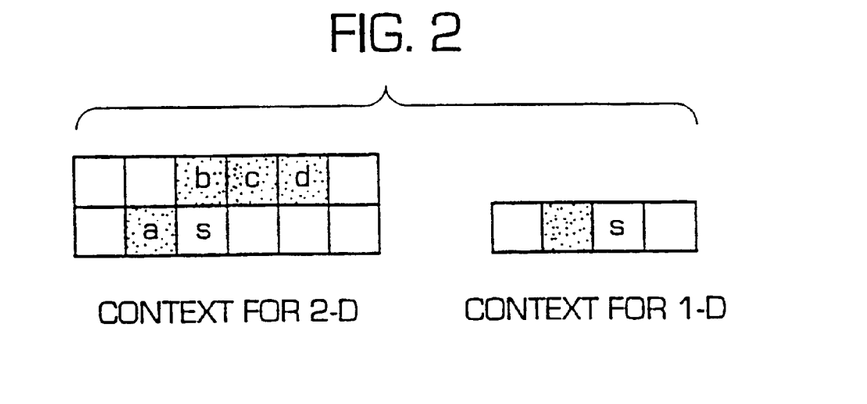
FIG. 2 is an illustration of a context for arithmetic coding using one dimensional (1-D) and two dimensional (2-D) approaches.

The aforementioned method to update the counts $N_b$ and $N_w$ helps to adapt to the local distribution of white and black pels. However, this scheme fails to exploit the redundancy present in the document. The counts $N_b$ and $N_w$ gives a measure of the probability of a pel being white or black. But, the probability of a pel being white or black can be better described if the "color" of some of the adjacent pels are known. This set of adjacent pels is defined to be the context. In FIG. 2, the pel marked 's' is being presently encoded and the shaded pels form the context for 's'. The context in this case consists of 4 pels, each of which can be a B or W. So, there are 16 ($=2^4$) possible combinations (or states) that the context can assume. The redundancy in the document can be exploited by maintaining a pair of counts for each possible state of the context. When a pel 's' is encoded, first the state is determined from the context and then the counts corresponding to that state are used in encoding.

It is necessary to exercise caution in selecting the context. Selecting too small a context might not exploit the redundancy in the document well, therefore will decrease the compression efficiency. Selecting too large a context, might just increase the computational complexity and memory requirements without contributing to the compression efficiency. The implementation of arithmetic coding that was used in the simulations for this invention is a modification of the version presented in Witten, I. H., Neal, R. M., Cleary, J. G., "Arithmetic Coding for Data Compression", Communications of the ACM, Volume 30, Number 6, June 1987.

An object of the present invention is the identification of proper contexts for standard facsimile documents, End Of Line (EOL) masking and error detection.

A further object is prevent the effect of a propagation of a transmission error to the whole document by using a combination of one-dimensional and two-dimensional arithmetic coding.

Another object is to present appropriate contexts for the probabilistic models associated with arithmetic coding for one and two dimensional cases.

Yet another object is to provide an error detection scheme to identify the presence of transmission errors.

SUMMARY OF THE INVENTION

The present invention is a facsimile system embodying a signal processing method wherein a document is scanned and a sequence of symbols is generated for each of a plurality of scan lines. The sequence of symbols are arithmetic encoded by mapping the symbols to real numbers in a predetermined interval. The real numbers are subject to a binary expansion for transmission by a transmitter. After transmission and reception at a receiver, the received signal is inverse mapped to retrieve the encoded signals.

The present invention further comprises arithmetic coding the scan lines using a combination of one-dimensional and two-dimensional arithmetic coding. Specifically, the arithmetic encoding step further comprises 2-D coding a first plurality of adjacent scan lines, followed by 1-D coding at least one scan line subsequent to the plurality of scan lines. This sequence of 2-D and 1-D coding can be repeated for a plurality of scan lines generated from scanning a document.

Yet another feature of the invention is the application of an end of line (EOL) code to each encoded line. In particular, a first denomination bit is applied whenever a string of N second denomination bits occurs in the compressed bit stream, the combination of N second denomination bits being followed by a first denomination bit to identifying the sequence as not an EOL A further feature of the invention is to conduct the scanning with a reduced horizontal resolution through minimum difference compression.

Yet another feature of the invention is to apply, at the end of an encoding of a scan line, M bits to represent the "quarter" in which the arithmetic coding interval lies.

DESCRIPTION OF THE PREFERRED EMBODIMENTS

The present invention concerns a method and apparatus for compressing facsimile documents based on arithmetic coding. Underlying the invention is the use of a combination of one-dimensional and two-dimensional arithmetic coding, in order to ensure that the effect of a transmission error is not propagated to the whole document, together with an error detection scheme to identify the presence of transmission errors.

Fundamental to the present invention is the task of identifying an appropriate context for one and two dimensional arithmetic coding. FIG. 2 shows the contexts used for one and two dimensional coding. The appropriate contexts were arrived at after thorough experimentation with over 25 facsimile documents in standard resolution, as reflected in ITU recommendations. Specifically, the Standardization of Group 3 Facsimile Apparatus for Document Transmission, ITU-T Recommendation T.4, defines standard resolution to be 3.85 line/mm and 1728 pels along the scan line. According to the present invention, the horizontal resolution is reduced by half through a maximum-differences compression, which is designed to preserve the black-to-white or white-to-black transitions. The resulting document is then coded with arithmetic coding.

Also fundamental is the use of a combination of 1-D and 2-D coding to code the lines in the facsimile document. A line is said to be 1-D coded, if the context used in coding the pels in that line does not contain any pels from the previous line. Similarly, a line is said to be 2-D coded, if the context used in coding the pels in that line contains pels from the previous lines. In accordance with a preferred embodiment of the invention, every fourth line is 1-D coded with the three intermediate lines coded by 2-D coding. Two dimensional coding exploits the vertical redundancy in the document, but allows decoding errors in a line to be propagated to the following lines. To prevent this, every fourth line is 1-D coded. This ensures that any error in the bitstream caused by the channel does not propagate to more than four lines.

TABLE 1

Prior Initialization of the probabilities for 2-dimensional Mode of
Arithmetic Coding (the pels a, b, c, and d are as designated in FIG. 1).
Context for Arithmetic Coding

| Pel a | Pel b | Pel c | Pel d | $N_w$ | $N_b$ |
|---|---|---|---|---|---|
| B | B | B | B | 1 | 27 |
| B | B | B | W | 5 | 23 |
| B | B | W | B | 7 | 21 |
| B | B | W | W | 11 | 17 |
| B | W | B | B | 19 | 9 |
| B | W | B | W | 13 | 15 |
| B | W | W | B | 15 | 13 |
| B | W | W | W | 19 | 9 |
| W | B | B | B | 9 | 19 |
| W | B | B | W | 13 | 15 |
| W | B | W | B | 15 | 13 |
| W | B | W | W | 19 | 9 |
| W | W | B | B | 17 | 11 |
| W | W | B | W | 21 | 7 |
| W | W | W | B | 23 | 5 |
| W | W | W | W | 27 | 1 |

Table 1 shows the initial values of the counts used for the two dimensional coding. These initial counts have been arrived at through testing over a varied set of facsimile documents. Every fourth scan line is coded using one dimensional coding. When the following line is coded using two dimensional coding, the $N_w$ and $N_b$ are initialized according to Table 1. As the encoding process continues these counts are updated. For 1-D coding, if the context pel is a B, then $N_b$ and $N_w$ are initialized to be 9 and 1 respectively, and vice versa if the context pel is a W. The compression efficiency achieved is different for different documents, but is in the range of 1.6 to 2.0, when compared to the standard T4 one dimensional compression.

After each scan line is coded using arithmetic coding (either 1D or 2D), it is terminated by an End Of Line (EOL) code. EOL is represented by a string of eleven zeros followed by a one (000000000001). It is necessary to ensure that this EOL bit combination does not occur in the compressed bit stream representing a scan line. This is achieved by introducing a '1' bit whenever a string of ten zeros occurs in the compressed bit stream. While decoding, if the decoder encounters a string of ten zeros and if the next bit is a '1', then it is discarded. If the string of ten zeros is followed by a '0' bit, it is an EOL.

If transmission errors are introduced, they can result in incorrect decoding of a scan line. However, it is possible to detect the occurrence of an error, since each scan line is delimited by an EOL and the number of pels in a scan line is known. There are two possible scenarios indicating the presence of an error. First, the entire scan line is decoded before an EOL is reached. Second, an EOL is encountered before the entire scan line is decoded. The algorithm used to implement arithmetic coding is a modification of the version presented in Witten, I. H., Neal, R. M., Cleary, J. G., "Arithmetic Coding for Data Compression", Communications of the ACM, Volume 30, Number 6, June 1987, with 16 bit arithmetic. At the end of an encoding of a scan line, the encoder outputs two bits to represent the "quarter" in which the arithmetic coding interval lies. These two bits can be either '01' or '10' and will be followed by the EOL to denote the end of the scan line. However, if the last two bits happen to be '10', this trailing '0' can be confused with the zeros in EOL. To circumvent this, a '1' bit is introduced between the two bits representing the "quarter" and the EOL.

For a 16 bit arithmetic implementation, the decoder first reads the 16 bits of the compressed data and then exactly mimics the operation of the encoder, i.e., decoder maintains the changes in the values of the probabilities, coding interval and takes in input bits at the same time when the encoder outputs bits, etc. Owing to this nature of the implementation, the decoder "leads" the encoder by 16 bits, i.e., the decoder will require 16 bits more than the compressed data output by the encoder to generate a scan line. Since the encoder generates 15 extra bits (2 bits to represent the quarter, a '1' bit and 12 bits in EOL), the decoder would require one more bit after EOL is reached to completely decode a scan line. This is used to detect the presence of errors. The actual value of this extra bit, whether '0' or '1', is immaterial. If the decoder requires more than one extra bit after EOL to generate a scan line, then this is an indication of an error. On the other hand, if the decoder does not require an extra bit or if the scan line is decoded before the EOL is reached, this again is an indication of an error.

Figure 3:
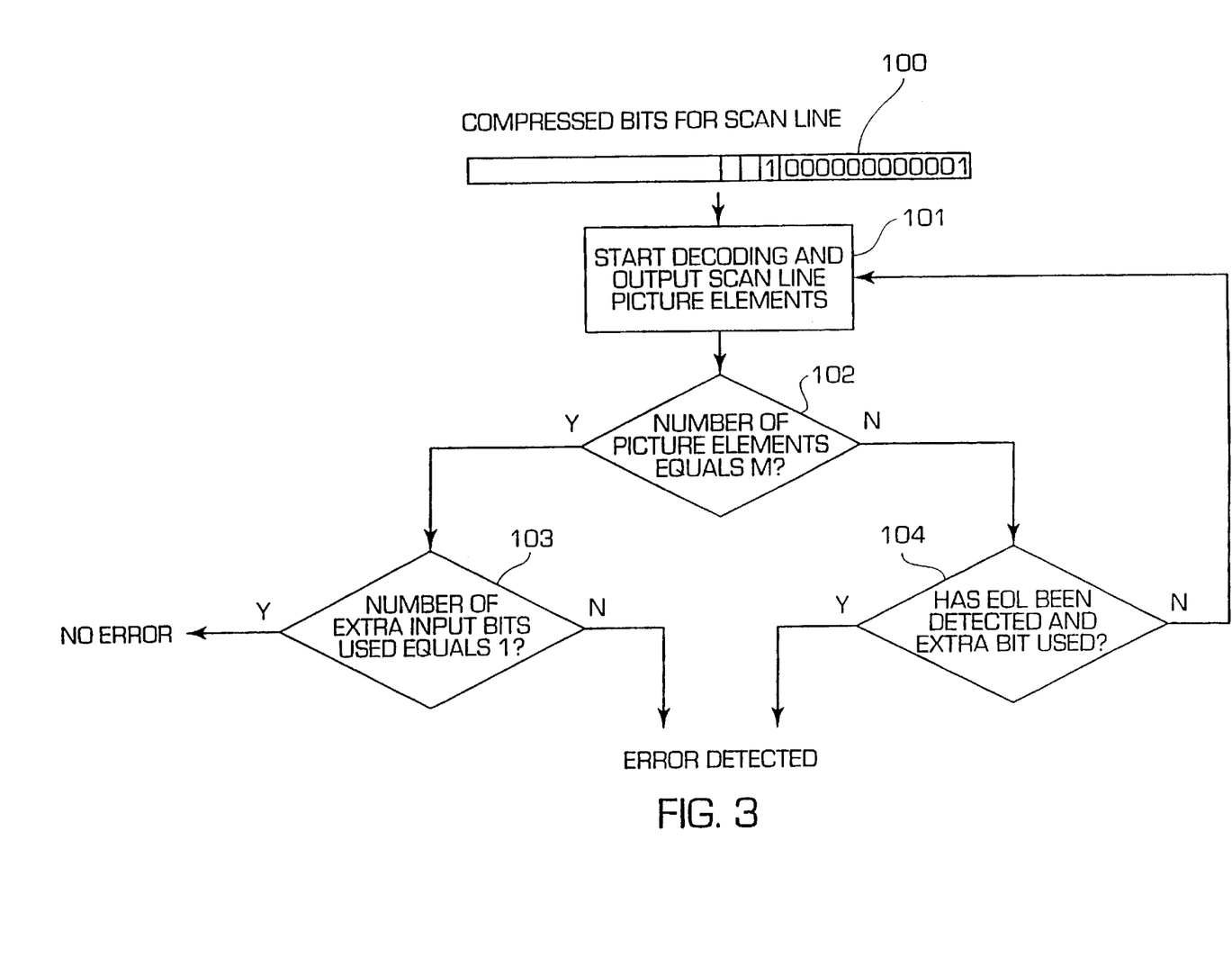
FIG. 3 is a flow chart for error detection at the decoder, in accordance with the present invention.

FIG. 3 shows a flow chart for error detection at the decoder. As seen at the top of the figure, a series of compressed bits for a single scan line, illustrated as individual blocks with a 1 or a 0, is followed by an EOC comprising eleven 0's and a single 1. The bits are input to a process 101 for starting decoding and outputting a scan line of picture elements. That series of picture elements is provided to a decision 102 as to whether the number of picture elements equals M, where M is a desired number. If so, the processing proceeds along the Y path to a decision 103 as to whether the number of extra input bits used equals 1. If so, the Y path is followed and there is "no error". If not, the N path is followed and there is an "error detected". At decision 102, if the number of picture elements is not equal to M, the N path is followed and another decision 104 is used to determine whether EOL has been detected and an extra bit used. If EOL has been detected and an extra bit has been used, the Y path is followed and an "error detected" indication is given. If EOL has not been detected and extra bit used, the N path takes the program back to the start decoding and output scan line box 101 for further processing.

The arithmetic coding algorithm presented in the "Background" section is not amenable to implementation with finite precision arithmetic, because of precision problems. It can be observed that the range and the lower bound are floating point numbers between 0.0 and 1.0. The value of range decreases every time an input symbol is encoded. Therefore, as the encoding process proceeds, more and more bits are required to represent the range and the lower bound. Eventually, the precision requirement will not be met by the hardware platform on which the algorithm is implemented.

A recourse to the above precision problem is to modify the arithmetic coding algorithm so that lower bound, upper bound and range are represented by integers and all operations are restricted to integer manipulations. A modified arithmetic coding algorithm that uses 16-bit integer arithmetic is presented here. In the following discussion, all divisions should be interpreted as integer divisions, i.e., for example, 10/3=3.

The initial coding interval of [0.0,1.0) is replaced by an integer interval of 0 to 216-1. The initial values of $L_0$, $U_0$ and $R_0$ are chosen to be $L_0=0$, $U_0=2^{16}-1$ and $R_0=2^{16}$. Two constants QUAR=$(2^{16}-1)/4$ and HALF=2×QUAR are defined. The probabilities ~b and P,~, are restricted such that, both these probabilities can be written as a ratio of two integers, i.e., $P_b=N_b/(N_b+N_w)$ and $P_w=N_w/(N_b+N_w)$. $N_w$ and $N_b$ can be interpreted as the counts of number of occurrences of the B and W symbols. $L_{(n-1)}$, $U_{(n-1)}$ and $R_{(n-1)}$ are the values of lower bound, upper bound and range before the $n^{th}$ symbol is encoded.

Figure 4:
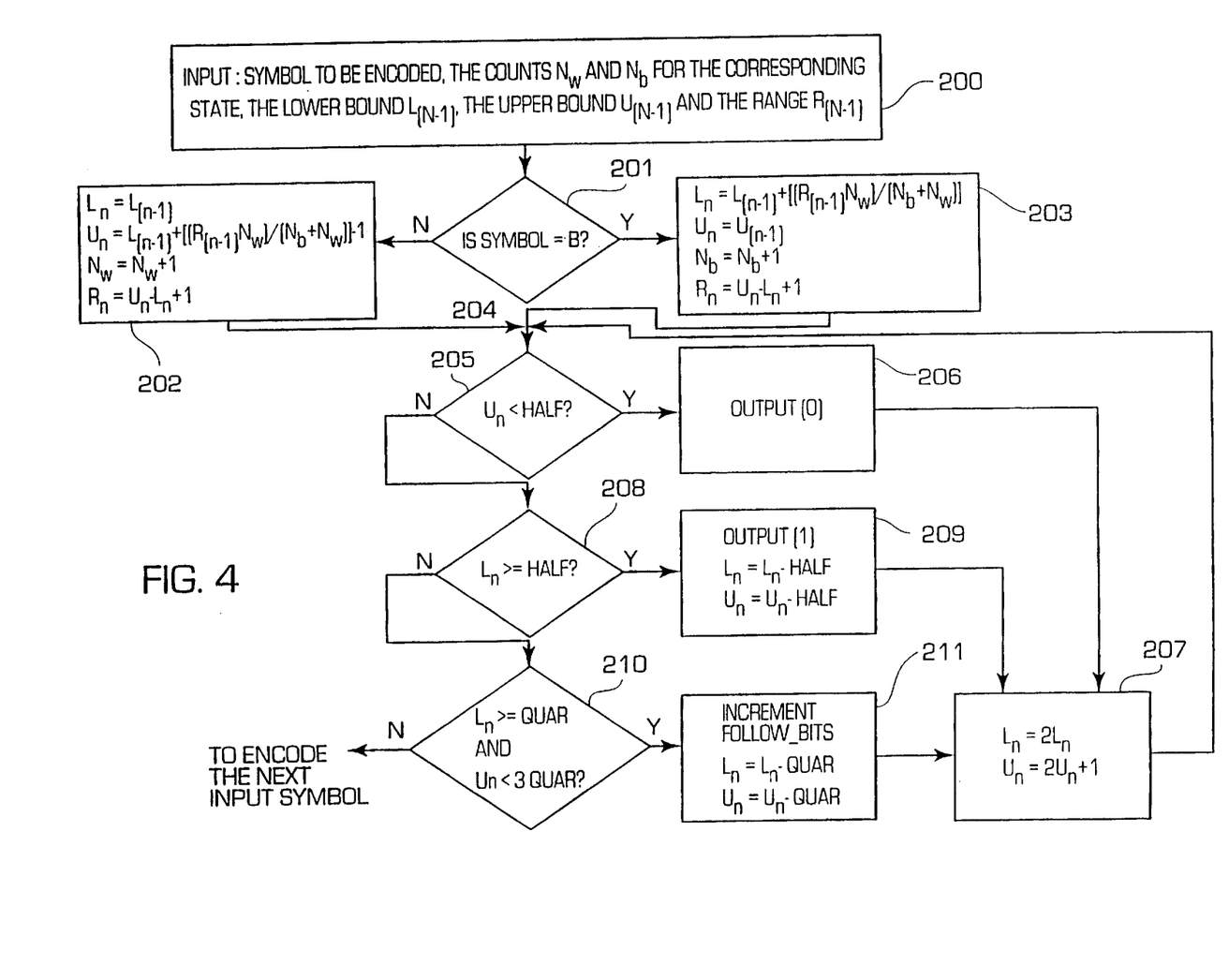
FIG. 4 is a flow chart of an arithmetic encoding algorithm used in the present invention.

With reference to FIG. 4, a flow chart for encoder operation is illustrated and at step 200, symbol to be encoded, as well as the counts $N_w$ and $N_b$, the bounds $L_{(n-1)}$, $U_{(n-1)}$ and the range $R_{(n-1)}$, are input. The following steps are then taken to update these values. First, in a decision 201, a check is made as to whether the nth symbol is B (or alternatively W). Then in steps 203 and 202, respectively:

If the $n^{th}$ symbol is B:

$$L_n = L_{(n-1)} + \frac{R_{(n-1)}N_w}{N_b + N_w};$$

If the $n^{th}$ symbol is W:

$$U_n = L_{(n-1)} + \frac{R_{(n-1)}N_w}{N_b + N_w} - 1.$$

The range becomes, $R_n = U_n - L_n + 1.$

From the above rules, it can be observed that the range $R_n$ decreases progressively. To avoid this problem, after encoding each symbol and updating $L_n$ and $R_n$, the following steps are followed.

Repeat (by returning to point 204) until none of the following conditions are true:
{
Condition 1 at decision 205: If $U_n$<HALF, then follow the Y path and output(0) at step 206;
go to HERE at step 207;
Condition 2 at decision 208: If $L_n \geq$ HALF, then follow the Y path and output(1) at step 209;
$L_n = L_n$-HALF;
$U_n = U_n$-HALF;
go to HERE at step 207;
Condition 3 at decision 210: If $L_n \geq$ QUAR and $U_n$<3 QUAR, then follow the Y path and proceed to step 211 where
follow_bits=follow_bits+1;
$L_n = L_n$-QUAR;
$U_n = U_n$-QUAR;
go to HERE at step 207;
HERE at step 207: $L_n = 2 L_n$; $U_n = 2 U_n + 1$;
}
where the function output( ) takes in a 0 or 1 as an argument and is defined as follows:
output(x)
{send x to the decoder;
if (follow_bits>0 and x=0) then
send follow_bits 1's to the decoder;
if (follow_bits>0 and x=1) then
send follow_bits 0's to the decoder;
}
After encoding all input symbols, two more bits corresponding to the quarter in which the coding interval lies are sent. If the lower bound is less than QUAR, then the upper bound is greater than HALF, and the coding interval spans the interval QUAR to HALF. To represent this, bits 01 are sent. If the lower bound is greater than or equal to QUAR, then the upper bound is greater than 3*QUAR, and the coding interval spans the interval HALF to 3*QUAR. To represent this, bits 10 are sent.

Figure 5:
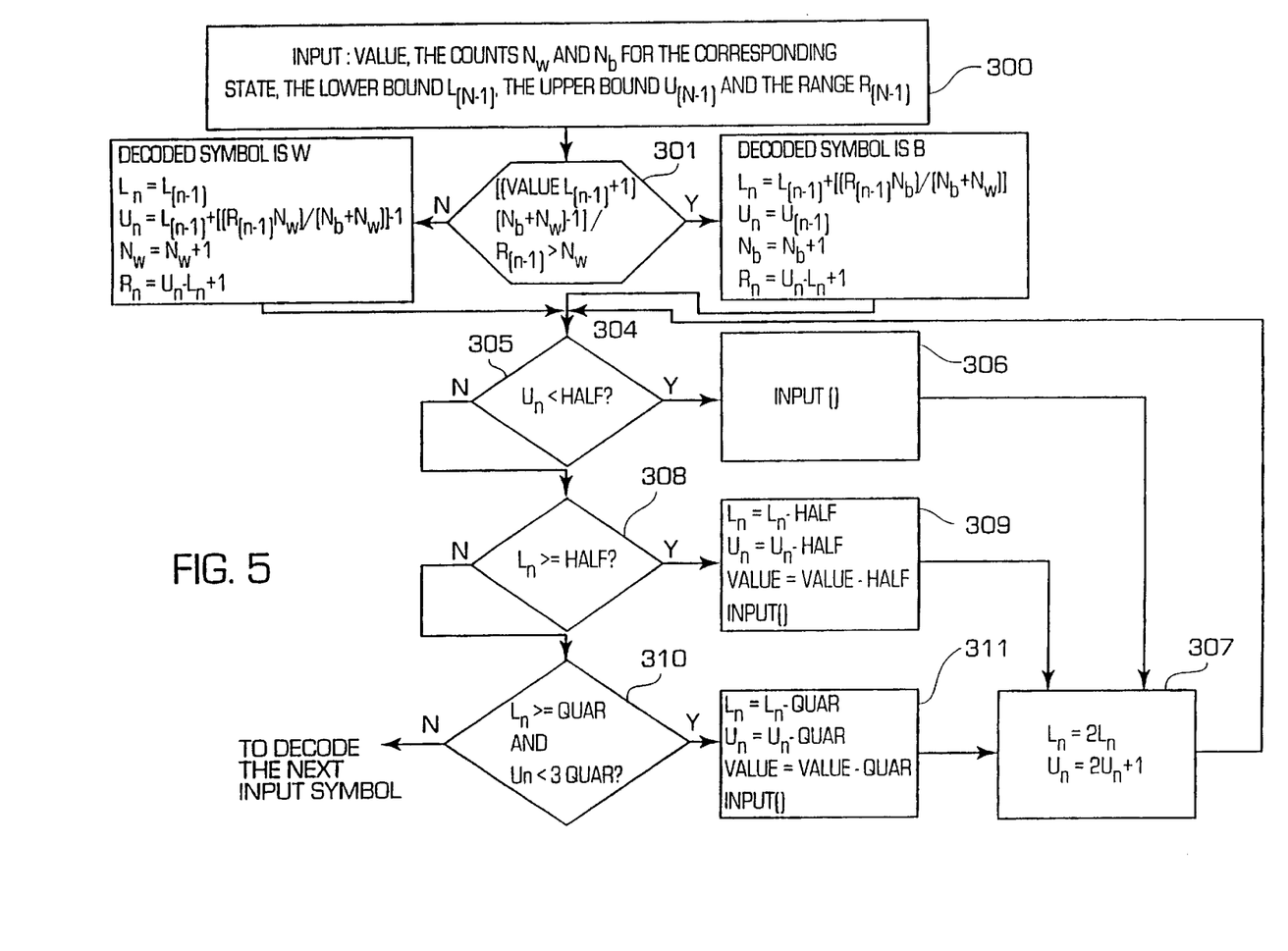
FIG. 5 is a flow chart of an arithmetic decoding algorithm used in the present invention.

Turning next to the arithmetic decoder, its functions may be understood with regard to FIG. 5 as follows. To begin with at step 300, 16 bits received from the encoder are stored in a register value, with the first received bit placed at the MSB position and the $16^{th}$ bit placed at the LSB. $L_0$, $U_0$, $R_0$, $N_b$, $N_w$, QUAR and HALF are initialized to be exactly the same as at the encoder. The decoder performs the same operations performed at the encoder by updating the lower, upper bound and range. Since the update rules are different for symbols B and W, the decoder has to first decode the symbol. The following rule in step 301 is used to decode the symbol:

if $$\frac{[(\text{value} - L_n + 1)(N_b + N_w) - 1]}{R_n} > N_w$$

then the symbol is B,
otherwise the symbol is W.
Then in steps 303 and 302, respectively:
If the $n^{th}$ symbol is B:

$$L_n = L_{(n-1)} + \frac{R_{(n-1)}N_w}{N_b + N_w};$$

If the $n^{th}$ symbol is W:

$$U_n = L_{(n-1)} + \frac{R_{(n-1)}N_w}{N_b + N_w} - 1.$$

The range becomes, $R_n = U_n - L_n + 1.$

From the above rules, it can be observed that the range $R_n$ decreases progressively. To avoid this problem, after encoding each symbol and updating $L_n$ and $R_n$, the following steps are followed.

Repeat (by returning to point 304) until none of the following conditions are true:
{
Condition 1 at decision 305: If $U_n$<HALF, then follow the Y path and input(0) at step 306;
go to HERE at step 307;
Condition 2 at decision 308: If $L_n \geq$ HALF, then follow the Y path and input(1) at step 309;
$L_n = L_n$-HALF;
$U_n = U_n$-HALF;
go to HERE at step 307;
Condition 3 at decision 310: If $L_n \geq$ QUAR and $U_n$<3 QUAR, then follow the Y path and proceed to step 311 where
follow_bits=follow_bits+1;
$L_n = L_n$-QUAR;
$U_n = U_n$-QUAR;
go to HERE at step 307;
HERE at step 307: $L_n = 2 L_n$; $U_n = 2 U_n + 1$;
}
where the function input( ) takes in a 0 or 1 as an argument and is defined as i follows:
input(x)
{send x to the encoder;
if (follow_bits>0 and x=0) then
send follow_bits 1's to the encoder;
if (follow_bits>0 and x=1) then send follow_bits 0's to the encoder;
}
Note the difference at the decoder in that it uses an input( ) function in place of the output(x) function used at the encoder. The input( ) function performs the following:

input( )
{
Left shift the value register by one position;
Place the next bit received from the encoder at the LSB position of value;
}

While the present invention has been described according to certain preferred embodiments, embodiments are for illustrative purposes only and the invention is not limited thereto, but is defined by the claims appended hereto.

I claim:

1. In a facsimile system, a signal processing method comprising:
   scanning a document and generating a sequence of symbols for each of a plurality of scan lines;
   arithmetic encoding said sequence of symbols in said scan lines by mapping said symbols to real numbers in a predetermined interval using a combination of one-dimensional and two-dimensional arithmetic coding by 2-D coding a first plurality of adjacent scan lines followed by 1-D coding at least one scan line subsequent to said plurality of scan lines;
   transmitting a signal comprising a binary expansion of said real numbers;
   receiving said transmitted signal;
   and inverse mapping said received signals to retrieve the encoded symbols.

2. The method of claim 1 wherein said steps of 2-D encoding followed by 1-D encoding are repeated for a plurality of scan lines generated from a scanning a document.

3. The method of claim 2 wherein, following a 1-D coding of a scan line, a subsequent 2-D encoded line is initialized using updated context.

4. The method of claim 3, further comprising applying a first denomination bit whenever a string of N second denomination bits occurs in the compressed bit stream, said combination of N second denomination bits followed by a first denomination bit to identifying the sequence as not an EOL.

5. The method of claim 1 wherein said transmitting step comprises applying an end of line (EOL) code to each encoded line.

6. The method of claim 1 wherein said scanning step is conducted with a reduced horizontal resolution through minimum difference compression.

7. The method of claim 1 wherein the arithmetic encoding step comprises, at the end of an encoding of a scan line, applying M bits to represent the "quarter" in which the arithmetic coding interval lies.

8. The method of claim 7 wherein said 2 bits are followed by an EOL to denote the end of the scan line and a third bit is introduced between the two bits representing the "quarter" and the EOL.

9. The method of claim 1 wherein said arithmetic encoding step represents black and white pels, and wherein the arithmetic coding algorithm utilizes parameters defining a lower bound, an upper bound and a range, wherein said parameters are represented by integers and all processing comprises integer manipulations.

10. A method of encoding a compressed facsimile signal, comprising a plurality of B and W symbols, using arithmetic coding, comprising:
    W-BLACK, W-WHITE, and two constants QUAR=$(2^{16}-1)/4$ and HALF=$2 \times$QUAR;
    inputting a symbol to be encoded, as well as initial values of counts $N_w$, and $N_b$, where $N_W$ and $N_B$ are the counts of the number of occurrences of the B and W symbols, lower bound $L_{(n-1)}$, upper bound $U_{(n-1)}$ and the range $R_{(n-1)}$;
    updating said initial values, said updating step comprising:
    checking whether the $n^{th}$ symbol is B or W;
    If the $n^{th}$ symbol is B:

$L_n = L_{(n-1)} + R_{(n-1)} N_w$ $N_b + N_w$ $U_n = U_{(n-1)}$

If the $n^{th}$ symbol is W:

$L_n = L_{(n-1)}$;

$U_n = L_{(n-1)} + R_{(n-1)} N_w - 1$ $N_b + N_w$

The range becomes, $R_n = U_n - L_n + 1$;

after encoding each symbol and updating $L_n$ and $R_n$, repeat the process until none of the following conditions are true:
{
Condition 1: If $U_n <$HALF, then follow the Y path and output(0);
go to HERE;
Condition 2: If $L_n \geq$HALF, then follow the Y path and output(1);
   $L_n = L_n -$HALF;
   $U_n = U_n -$HALF;
go to HERE;
Condition 3: If $L_n \geq$QUAR and $U_n <3$ QUAR, then follow_bits=follow_bits+1;
   $L_n = L_n -$QUAR;
   $U_n = U_n -$QUAR;
go to HERE;
HERE: $L_n = 2L_n$; $U_n = 2 U_n + 1$;
}
where the function output( ) takes in a 0 or 1 as an argument and is defined as follows:
output(x) {send x to the decoder;
if (follow_bits>0 and x=0) then send follow_bits 1's to the decoder;
if (follow_bits>0 and x=1) then
send follow_bits 0's to the decoder;
}.

11. The method of claim 10, wherein, after encoding all input symbols, two more bits corresponding to the quarter in which the coding interval lies are sent.

12. The method of claim 11 wherein, if the lower bound is less than QUAR, then the upper bound is greater than HALF, and the coding interval spans the interval QUAR to HALF and bits 01 are sent; and if the lower bound is greater than or equal to QUAR, then the upper bound is greater than 3*QUAR, and the coding interval spans the interval HALF to 3*QUAR and bits 10 are sent.

13. A method of decoding a compressed facsimile signal, representing a plurality of B and W symbols that were encoded by using arithmetic coding, comprising:

W-BLACK, W-WHITE, and two constants QUAR=($2^{16}$−1)/4 and HALF=2×QUAR;

inputting a symbol to be encoded, as well as initial values of counts $N_w$ and $N_b$, where $N_W$ and $N_B$ are the counts of the number of occurrences of the B and W symbols, lower bound $L_{(n-1)}$, upper bound $U_{(n-1)}$ and the range $R_{(n-1)}$;

updating said initial values, said updating step comprising:

checking whether the nth symbol is B or W;
If the $n^{th}$ symbol is B:

$$L_n = L_{(n-1)} + R_{(n-1)} N_w$$

$$N_b + N_w$$

$$U_n = U_{(n-1)}$$

If the $n^{th}$ symbol is W:

$$L_n = L_{(n-1)};$$

$$Un = L_{(n-1)} + R_{(n-1)} N_w - 1$$

$$N_b + N_w$$

The range becomes, $$R_n = U_n - L_n + 1;$$

after encoding each symbol and updating $L_n$ and $R_n$ repeat the process until none of the following conditions are true:

{

Condition 1: If $U_n$<HALF, then follow the Y path and output(0);

go to HERE;

Condition 2: If $L_n$≧HALF, then follow the Y path and output(1);

$L_n = L_n$−HALF;

$U_n = U_n$−HALF;

go to HERE;

Condition 3: If $L_n$≧QUAR and $U_n$<3 QUAR, then follow_bits=follow_bits+1;

$L_n = L_n$−QUAR;

$U_n = U_n$−QUAR;

go to HERE;

HERE: $L_n = 2L_n$; $U_n = 2 U_n + 1$;

where the function output( ) takes in a 0 or 1 as an argument and is defined as follows:

output(x)

{send x to the encoder;

if (follow_bits>0 and x=0) then send follow_bits 1's to the encoder;

if (follow_bits>0 and x=1) then send follow_bits 0's to the encoder;

}.

14. The method of claim 13, further comprising using two or more bits corresponding to the quarter in which the coding interval lies are sent for decoding.

15. The method of claim 13 wherein, if the lower bound is less than QUAR, then the upper bound is greater than HALF, and the coding interval spans the interval QUAR to HALF and bits 01 used; and if the lower bound is greater than or equal to QUAR, then the upper bound is greater than 3*QUAR, and the coding interval spans the interval HALF to 3*QUAR and bits 10 are used.

16. A facsimile system, comprising:

means for scanning a document and generating a sequence of symbols for each of a plurality of scan lines;

means for arithmetic encoding said sequence of symbols in said scan lines by mapping said symbols to real numbers in a predetermined interval using a combination of one-dimensional and two-dimensional arithmetic coding by 2-D coding a first plurality of adjacent scan lines followed by 1-D coding at least one scan line a subsequent to said plurality of scan lines;

means for transmitting a signal comprising a binary expansion of said real numbers;

means for receiving said transmitted signal; and means for inverse mapping said received signals to retrieve the encoded symbols.

17. A facsimile system comprising:

a transmitter, said transmitter comprising an arithmetic encoder for encoding a compressed facsimile signal, comprising a plurality of B and W symbols, using arithmetic coding, said encoder comprising:

W-BLACK, W-WHITE, and two constants QUAR=($2^{16}$−1)/4 and HALF=2×QUAR;

means for inputting a symbol to be encoded, as well as initial values of counts $N_n$, and $N_b$, where $N_W$ and $N_B$ are the counts of the number of occurrences of the B and W symbols, lower bound $L_{(n-1)}$, upper bound $U_{(n-1)}$ and the range $R_{(n-1)}$;

means for updating said initial values, said updating step comprising:

checking whether the $n^{th}$ symbol is B or W;
If the $n^{th}$ symbol is B:

$$L_n = L_{(n-1)} + R_{(n-1)} N_w$$

$$N_b + N_w$$

$$U_n = U_{(n-1)}$$

If the $n^{th}$ symbol is W:

$$L_n = L_{(n-1)};$$

$$Un = L_{(n-1)} + R_{(n-1)} N_w - 1$$

$$N_b + N_w$$

The range becomes, $$R_n = U_n - L_n + 1;$$

means for, after encoding each symbol and updating $L_n$ and $R_n$, repeat the process until none of the following conditions are true:

{

Condition 1: If $U_n$<HALF, then follow the Y path and output(0);

go to HERE;

Condition 2: If $L_n$≧HALF, then follow the Y path and output(1);

$L_n = L_n$−HALF;

$U_n = U_n$−HALF;

go to HERE;

Condition 3: If $L_n$≧QUAR and $U_n$<3 QUAR, then follow_bits=follow_bits+1;

$L_n = L_n - QUAR$;
$U_n = U_n - QUAR$;
go to HERE;
}
HERE: $L_n = 2L_n$; $U_n = 2U_n + 1$;
where the function output( ) takes in a 0 or 1 as an argument and is defined as follows:
output(x)
{send x to the decoder;
if (follow_bits>0 and x=0) then send follow_bits 1's to the decoder;
if (follow_bits>0 and x=1) then send follow_bits 0's to the decoder;
{
and a receiver, said receiver comprising a means for decoding a compressed facsimile signal, representing a plurality of B and W symbols that were encoded by using arithmetic coding, comprising:

means for inputting a symbol to be encoded, as well as initial values of counts $N_w$ and $N_b$, where $N_W$ and $N_B$ are the counts of the number of occurrences of the B and W symbols, lower bound $L_{(n-1)}$, upper bound $U_{(n-1)}$ and the range $R_{(n-1)}$;

means for updating said initial values, said updating step comprising:
checking whether the nth symbol is B or W;
If the $n^{th}$ symbol is B:

$L_n = L_{(n-1)} + R_{(n-1)} N_w$ $N_b + N_w$ $U_n = U_{(n-1)}$

If the $n^{th}$ symbol is W:

$L_n = L_{(n-1)}$;

$U_n = L_{(n-1)} + R_{(n-1)} N_w - 1$ $N_b + N_w$

The range becomes, $R_n = U_n - L_n + 1$;

means for, after encoding each symbol and updating $L_n$ and $R_n$ repeat the process until none of the following conditions are true:
{
Condition 1: If $U_n <$ HALF, then follow the Y path and output(0);
go to HERE;
Condition 2: If $L_n \geq$ HALF, then follow the Y path and output(1);
$L_n = L_n - $HALF;
$U_n = U_n - $HALF;
go to HERE;
Condition 3: If $L_n \geq$ QUAR and $U_n <$ 3 QUAR, then follow_bits=follow_bits+1;
$L_n = L_n - $QUAR;
$U_n = U_n - $QUAR;
go to HERE;
}
HERE: $L_n = 2L_n$; $U_n = 2U_n + 1$;
where the function output( ) takes in a 0 or 1 as an argument and is defined as follows:
output(x)
{send x to the encoder;
if (follow_bits>0 and x=0) then send follow_bits 1's to the encoder;
if (follow_bits>0 and x=1) then send follow_bits 0's to the encoder.

* * * * *